Figure 1:
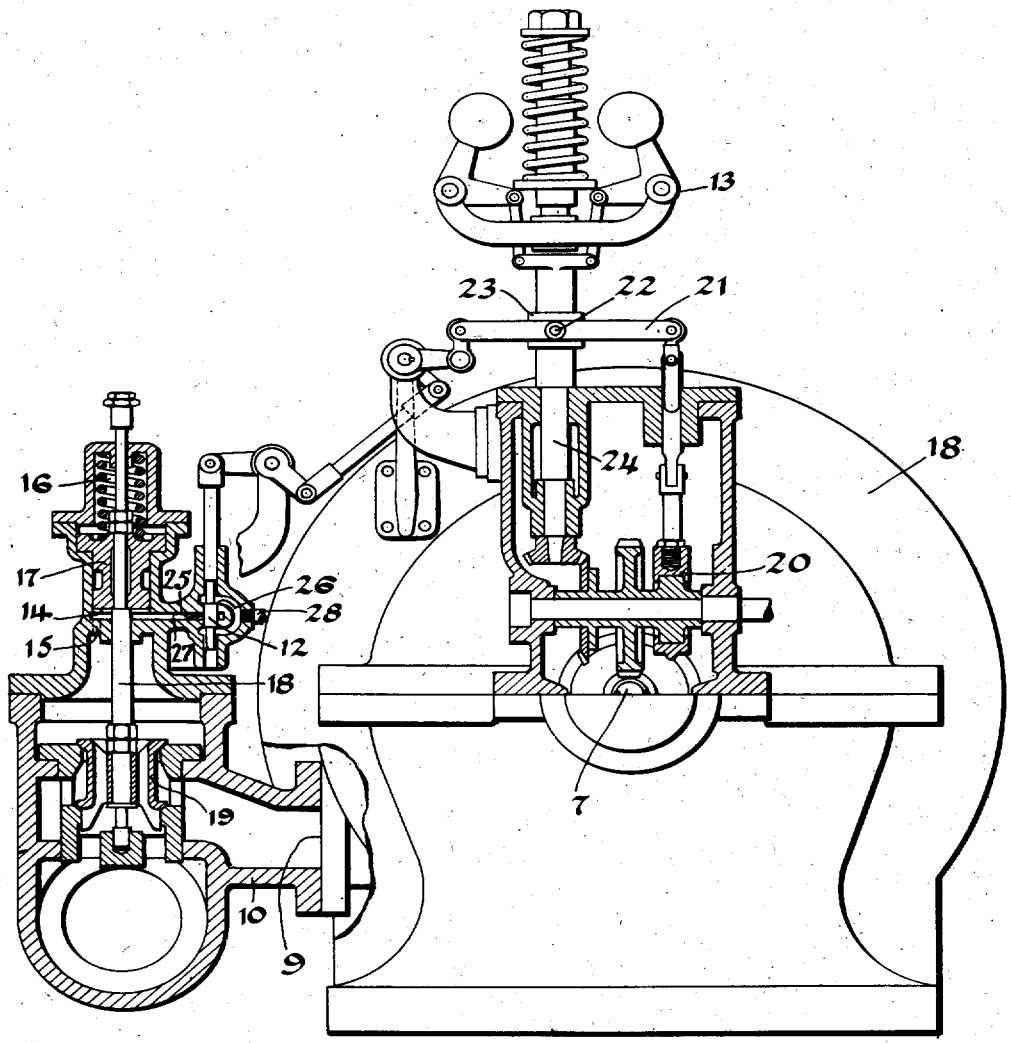

G. WESTINGHOUSE.
NOZZLE CONTROL FOR ELASTIC FLUID TURBINES.
APPLICATION FILED DEC. 29, 1905.

930,906.

Patented Aug. 10, 1909.
3 SHEETS—SHEET 1.

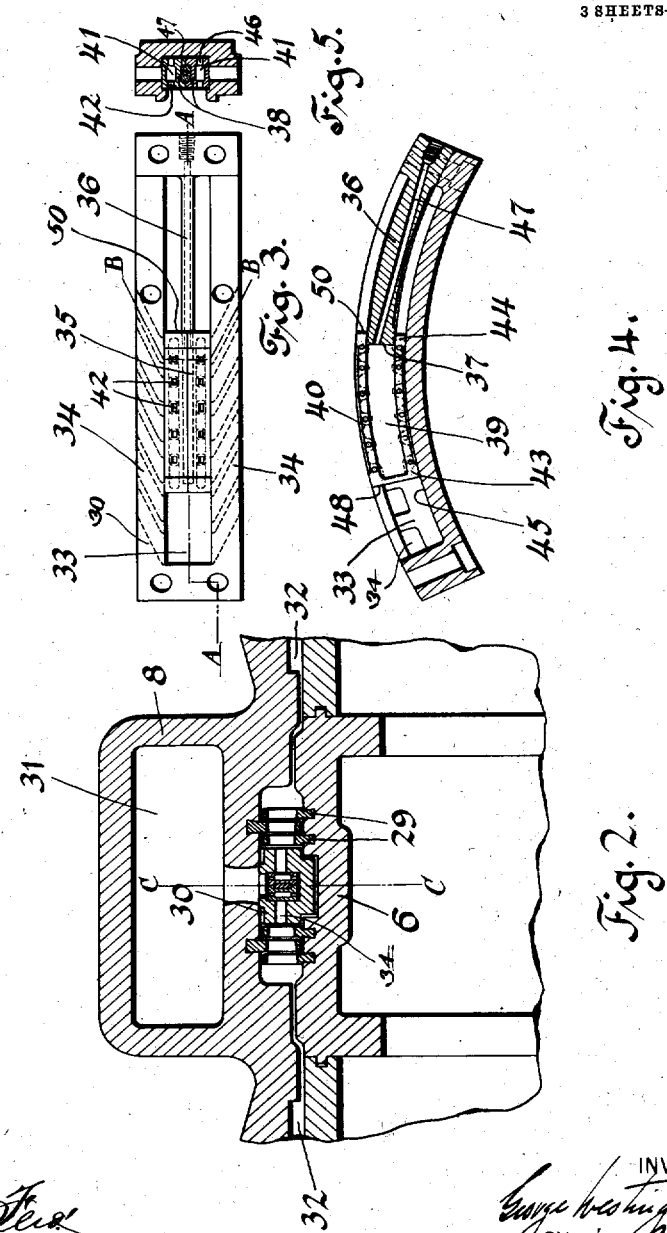

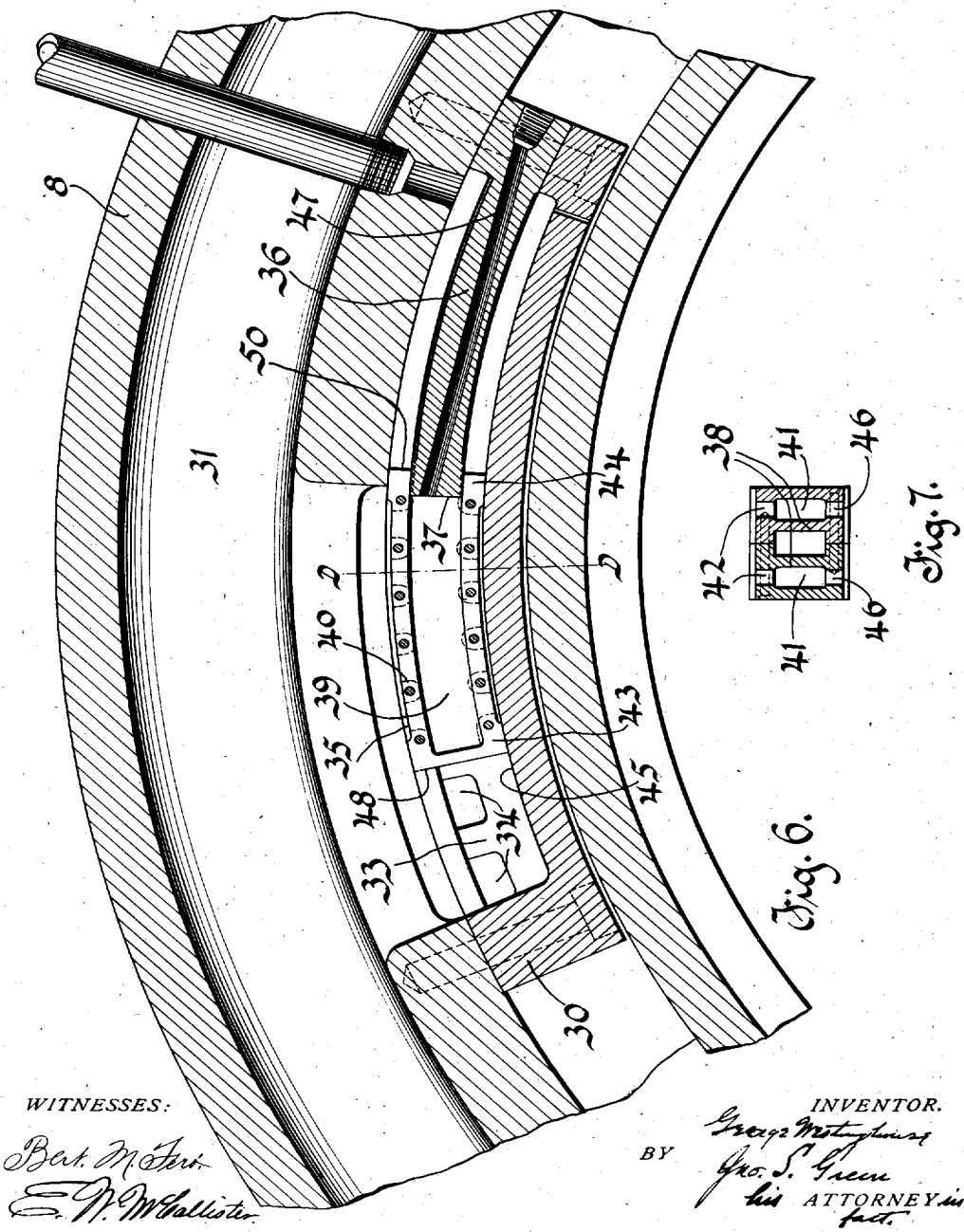

UNITED STATES PATENT OFFICE.

GEORGE WESTINGHOUSE, OF PITTSBURG, PENNSYLVANIA, ASSIGNOR TO THE WESTING-HOUSE MACHINE COMPANY, A CORPORATION OF PENNSYLVANIA.

NOZZLE CONTROL FOR ELASTIC-FLUID TURBINES.

No. 930,906.     Specification of Letters Patent.     Patented Aug. 10, 1909.

Application filed December 29, 1905. Serial No. 293,815.

*To all whom it may concern:*

Be it known that I, GEORGE WESTINGHOUSE, a citizen of the United States, and a resident of Pittsburg, in the county of Allegheny and State of Pennsylvania, have invented a new and useful Improvement in Nozzle Control for Elastic-Fluid Turbines, of which the following is a specification.

This invention relates to elastic fluid turbines and has for an object the production of effective means for governing such turbines.

In elastic fluid turbines various methods are utilized for varying the power of the turbine in accordance with the load demand and in most instances this is accomplished by varying the supply of motive fluid to the turbine in accordance with variations in its speed. In turbines utilizing the expansive force, the velocity, or the expansive and reactive force of the motive fluid, and to which the motive fluid is admitted through a number of nozzles or inlet ports, it becomes necessary, for an efficient operation of the turbine, to proportion the number of nozzles or the effective area of the nozzle openings in accordance with the amount of motive fluid admitted, or, more broadly, in accordance with the load demand.

An object of this invention, is, therefore, to vary, not only the amount of motive fluid supplied to the turbine in accordance with the load demand, but to vary the effective area of the motive fluid supply ports or nozzles in accordance with variations in the amount of fluid supplied.

I am aware that various methods have been utilized in accomplishing what may be called "nozzle control", and I do not, therefore, claim a broad or generic invention, my object being to effect a nozzle control which shall be effective and accurate and which shall render the turbine efficient throughout a greater range of loads.

These objects I attain in a turbine embodying the features herein described and illustrated in the accompanying drawings, throughout the several views of which like numbers are designated by corresponding numerals.

Figure 1 is an end view of a turbine (portions of which are shown in section) illustrating a method of proportioning the supply of motive fluid to a turbine which may be utilized in connection with my invention. Fig. 2 is a partial longitudinal section of a turbine and illustrates a detail of my invention. Fig. 3 is a plan view of a nozzle block forming a part of my invention. Fig. 4 is a section along the line A A of Fig. 3. Fig. 5 is a section along the line B B of Fig. 3. Fig. 6 is a partial cross-sectional elevation of the turbine along the line C—C of Fig. 2. Fig. 7 is a section along the line D—D of Fig. 6 of a reciprocable plunger forming a detail of my invention.

The turbine comprises a rotor 6 rigidly mounted on a shaft 7, which is journaled in suitable standards formed integrally with an exterior casing 8, which is provided with an inlet port 9 communicating through suitable passages with a governor-controlled admission valve 10.

The motive fluid, which will hereinafter be called steam for the sake of brevity, enters the turbine in puffs and the speed regulation is accomplished by proportioning the duration of the puffs to the load demand. This is done by means of a pilot valve 12 which is controlled by a governor 13, and which in turn controls the operation of the inlet valve 10. The valve 10 is adapted to be operated by steam pressure and is so arranged that steam entering a cylinder 14 through a passage 15 raises, against the action of a spring 16, a piston 17, which is rigidly connected to a valve stem 18 and thereby raises a valve disk 19 and opens the valve 10.

The actuating steam pressure in the cylinder 14 is controlled by the pilot valve 12 which periodically exhausts steam from the cylinder 14 and therefore allows the spring 16 to periodically close the valve 10.

The pilot valve is operated by a system of bell-cranks, levers and links, which is controlled by an eccentric 20, driven by the shaft 7 through suitable gears. A lever 21, forming a part of the pilot-valve operating system, is pivoted at 22 on a reciprocating sleeve 23, the position of which is controlled by the governor 13. Variations in speed of the turbine cause the sleeve 23 to move to different positions relative to the governor standard 24 and this varies the height of the fulcrum 22 of the lever 21, which in turn varies the throw of the valve 12 relative to its ports 25 and 26. The port 25 communicates through a passage 27 with the interior of the cylinder 14 and the ports 26 communicate through a suitable pipe 28 with the atmosphere or a condenser. As the load on the turbine increases, the period during which the cylinder 14 is closed to the exhaust, and consequently, the period during which the main valve 10 is open and admitting steam, increases, until at some predetermined speed of the turbine the valve disk 19 continues to pulsate at regular intervals, but does not reach its seat.

Blades 29 are radially mounted on the rotor 6 and are supplied with steam or other motive fluid by nozzle blocks 30, which communicate with an annular passage 31 formed integrally within the casing 8. The motive fluid, discharged from the blades 29, enters additional working blades (not shown) through annular passages 32 between the rotor and stator. The nozzle block 30 is rigidly mounted in the casing 8 and is provided with an interior chamber 33 adapted to supply steam from the passage 31 to the motive fluid passages at either side of the turbine. The chamber 33 communicates with the passage 31 and is provided with nozzle openings 34 arranged in pairs on either side of the block.

A reciprocating plunger 35 is adapted to operate within the chamber 33 and uncover successively the nozzle openings 34, as the supply of steam from the passage 31 increases to meet the increased load demand. The plunger 35 is formed in symmetrical halves and its lateral faces are finished to a running fit with the interior lateral faces of the chamber 33 and are adapted to close the nozzle openings 34.

The nozzle block 30 is provided with an integrally formed projecting portion or piston 36, which extends parallel to the walls of the chamber 33 and about which the symmetrical halves of the plunger 35 are adapted to fit. The end 37 of the piston 36 is provided with water grooves which form a steam-tight fit between the piston 36 and walls 38 of a chamber 39 formed within the plunger 35. The separate halves of the plunger are connected by screws suitably arranged in tapped lugs 40.

A steam space 41, provided between the walls 38 and the lateral walls of the plunger, communicates with the passage 31 through openings 42. The plunger 35 is so constructed that only the ends 43 and 44 are in contact with a face 45 of the chamber 33 and openings 46 extending through the walls of the plunger 35 connect the space between it and the face 45 of the nozzle block with the steam passages 41. By this arrangement the plunger 35 is practically balanced, the unbalanced steam pressure being sufficient to hold the block in its ways.

The chamber 39 communicates with the atmosphere through a passage 47, formed in the piston 36, and suitable pipes or passages (not shown), and is, therefore, subjected to atmospheric pressure. With the construction shown the end 48 of the plunger is subjected on one side to atmospheric pressure and at the other side to the steam pressure encountered at the nozzle openings. The face 50, however, is so arranged that it is exposed to boiler pressure or to the steam pressure in the supply mains. The pressure tending to move the plunger 35 and close the nozzles is, therefore, the steam pressure exerted on the face 50 in conjunction with atmospheric pressure within the chamber 39, and the pressure tending to move the piston to open the nozzles is the steam pressure exerted against the exterior face of the end 48. It is evident that by properly proportioning the areas of the faces 50 and 48 the plunger 35 may be made to respond to the slightest variations of pressure in the passage 31.

While the turbine is operating under light load the valve disk 19 pulsates and admits puffs of steam to the turbine through the passage 31 and the nozzle openings 34. The pulsations of the valve cause regular variations of steam pressure in the passage 31 and consequently the forward face of the end 48 of the plunger 35 is subjected to varying pressures. As the duration of the admission period increases, the valve 10 admits greater amounts of steam and at some predetermined load on the turbine the nozzle opening is not sufficient to accommodate the flow of steam through the passage 31 and the pressure resulting from confining the steam or restricting its flow is exerted against the forward face of the end 48 in opposition to the steam pressure on the face 50 and atmospheric pressure in the chamber 39, and causes the plunger 35 to reciprocate synchronously with the valve 10 and periodically open a sufficient number of nozzles to accommodate the turbine's demand for steam.

When the load on the turbine is so great that it slows down an appreciable amount the valve disk 19 continues to pulsate but does not reach its seat and steam is admitted through the nozzles 34 in a continuous stream, the pulsations of the valve, however, occasion variation in the steam pressure which cause the plunger 35 to reciprocate synchronously with the pulsations of the valve disk. The tendency of the plunger 35 to stick and to be rendered ineffective or inaccurate in operation is practically overcome by its continuous reciprocations, as the friction of rest between the plunger 35 and the surfaces of the chamber 33 is overcome by the fluctuations of the steam pressure in the passage 31.

The nozzle block may be so constructed that one of the nozzles 34 will always remain open and the turbine may be provided with two or more nozzle blocks.

While I have described my invention in connection with a double-flow turbine, or a bi-laterally symmetrical turbine, I do not wish to limit its application to this type of turbine or in fact to any specific type, and while I have illustrated my invention in connection with a steam-actuated admission valve, I wish it to be specifically understood that its application is not to be limited to such a valve, as it may, in fact, be utilized with valves supplying the motive fluid to the turbine in continuous streams, or with any ordinary throttle valve.

Having thus described my invention, what I claim as new and useful is:

1. In an elastic fluid turbine, a fluid inlet, a valve controlling said inlet, a plurality of nozzles communicating therewith, a speed governor adapted to automatically control said valve mechanisms whereby the fluid passing said valve is caused to pulsate and means subjected to constant fluid pressure and sensitive to the variations of fluid pressure admitted by said valve for opening said nozzles.

2. In an elastic fluid turbine, a fluid inlet, a valve controlling said inlet, a plurality of nozzles communicating with said inlet, mechanisms for causing the fluid passing said valve to pulsate and means, subjected to atmospheric and fluid pressure and sensitive to the variations of fluid pressure admitted by said inlet, for opening said nozzles.

3. In an elastic fluid turbine a fluid inlet, a valve controlling said inlet, a plurality of nozzles communicating therewith, a speed governor adapted to automatically control said valve, mechanisms whereby the fluid admitted by said valve is caused to pulsate and means, subjected to atmospheric pressure and sensitive to the variations of fluid pressure admitted by said valve for opening said nozzles.

4. In combination with an elastic fluid turbine, a nozzle block comprising a chamber communicating with the motive fluid passages of said turbine, a plurality of fluid nozzles communicating with said chamber, a plunger subjected to a combination of atmospheric and fluid pressure and sensitive to the variations of fluid pressure in said motive fluid supply passages, reciprocable within the said chamber and adapted to normally close said nozzles and means dependent on the fluid pressure for moving said plunger to open and close said nozzles.

5. In an elastic fluid turbine, a fluid inlet, a governor-controlled valve for said inlet, a plurality of nozzles communicating therewith, mechanisms for causing the fluid passing said valve to pulsate and means, subjected to atmospheric and fluid pressure and sensitive to the variations of fluid pressure admitted by said inlet for opening said nozzles.

6. In an elastic fluid turbine, a fluid inlet, a plurality of nozzles communicating therewith, mechanisms for causing the fluid passing said inlet to pulsate and means, subjected to atmospheric pressure and sensitive to the variations of fluid pressure admitted by said inlet for opening said nozzles.

7. In an elastic fluid turbine, a fluid inlet, a plurality of nozzles communicating therewith, mechanisms whereby the fluid passing said inlet is caused to pulsate, and a reciprocable plunger, subjected to atmospheric pressure and sensitive to variations of fluid pressure admitted by said inlet, for opening said nozzles.

8. In an elastic fluid turbine, a fluid inlet, a plurality of nozzles communicating therewith, mechanisms whereby the fluid passing said inlet is caused to pulsate and a reciprocable plunger, subjected on one side to steam and atmospheric pressure and on the other side to the pressure admitted by said inlet for opening said nozzles.

9. In an elastic fluid turbine, a fluid inlet, a governor-controlled valve for said inlet, mechanisms whereby said valve is caused to pulsate the fluid passing said inlet, nozzles communicating with said inlet and a reciprocable plunger, subjected to constant fluid pressure and sensitive to the variations of fluid pressure admitted by said inlet, for opening said nozzles.

10. In an elastic fluid turbine, an admission valve, means for causing said valve to pulsate the fluid passing it, a plurality of fluid admission ports, and means, subjected to atmospheric pressure and sensitive to pressure variations of the fluid admitted by said valve for controlling said ports.

11. In an elastic fluid turbine, a plurality of fluid admission ports, a plunger controlling the operation of said ports, and a chamber located within said plunger and subjected to atmospheric pressure.

12. In an elastic fluid turbine, a segmental nozzle block provided with a plurality of nozzle openings, and a segmental plunger operating within said block to successively open said nozzles.

13. In an elastic fluid turbine, a segmental nozzle block provided with oppositely discharging nozzle openings, and a segmental plunger operating within said block and controlling the delivery of motive fluid through said openings.

14. In an elastic fluid turbine, a segmental nozzle block provided with nozzle openings, a segmental plunger operating within said block to control the delivery of motive fluid through said openings, and a chamber located within said plunger and exposed to atmospheric pressure.

15. In an elastic fluid turbine, a nozzle block provided with nozzle openings, a plunger operating within said block to control the delivery of motive fluid through said openings, and a chamber located within said plunger and exposed to atmospheric pressure.

16. In an elastic fluid turbine, a plurality of fluid nozzles, a valve controlling the delivery of motive fluid to said nozzles, means for causing aid valve to pulsate the fluid passing it and a plunger, sensitive to fluid pressure delivered by said valve and restrained by a constant fluid pressure, for successively opening said nozzle in response to an increase of load on said turbine.

In testimony whereof, I have hereunto subscribed my name this 27th day of December, 1905.

GEO. WESTINGHOUSE.

Witnesses:
CHARLES W. MCGHEE,
JNO. S. GREEN.

---

Correction in Letters Patent No. 930,906.

It is hereby certified that in Letters Patent No. 930,906, granted August 10, 1909, upon the application of George Westinghouse, of Pittsburg, Pennsylvania, for an improvement in "Nozzle Control for Elastic-Fluid Turbines," an error appears in the printed specification requiring correction, as follows: In line 7, page 4, the word "aid" should read *said;* and that the said Letters Patent should be read with this correction therein that the same may conform to the record of the case in the Patent Office.

Signed and sealed this 31st day of August, A. D., 1909.

[SEAL.]

F. A. TENNANT,
*Acting Commissioner of Patents.* openings, and a chamber located within said plunger and exposed to atmospheric pressure.

16. In an elastic fluid turbine, a plurality of fluid nozzles, a valve controlling the delivery of motive fluid to said nozzles, means for causing aid valve to pulsate the fluid passing it and a plunger, sensitive to fluid pressure delivered by said valve and restrained by a constant fluid pressure, for successively opening said nozzle in response to an increase of load on said turbine.

In testimony whereof, I have hereunto subscribed my name this 27th day of December, 1905.

GEO. WESTINGHOUSE.

Witnesses:
CHARLES W. MCGHEE,
JNO. S. GREEN.

---

Correction in Letters Patent No. 930,906.

It is hereby certified that in Letters Patent No. 930,906, granted August 10, 1909, upon the application of George Westinghouse, of Pittsburg, Pennsylvania, for an improvement in "Nozzle Control for Elastic-Fluid Turbines," an error appears in the printed specification requiring correction, as follows: In line 7, page 4, the word "aid" should read *said;* and that the said Letters Patent should be read with this correction therein that the same may conform to the record of the case in the Patent Office.

Signed and sealed this 31st day of August, A. D., 1909.

[SEAL.]

F. A. TENNANT,
*Acting Commissioner of Patents.*

It is hereby certified that in Letters Patent No. 930,906, granted August 10, 1909, upon the application of George Westinghouse, of Pittsburg, Pennsylvania, for an improvement in "Nozzle Control for Elastic-Fluid Turbines," an error appears in the printed specification requiring correction, as follows: In line 7, page 4, the word "aid" should read *said;* and that the said Letters Patent should be read with this correction therein that the same may conform to the record of the case in the Patent Office.

Signed and sealed this 31st day of August, A. D., 1909.

[SEAL.]

F. A. TENNANT,
*Acting Commissioner of Patents.*